Figure 1:
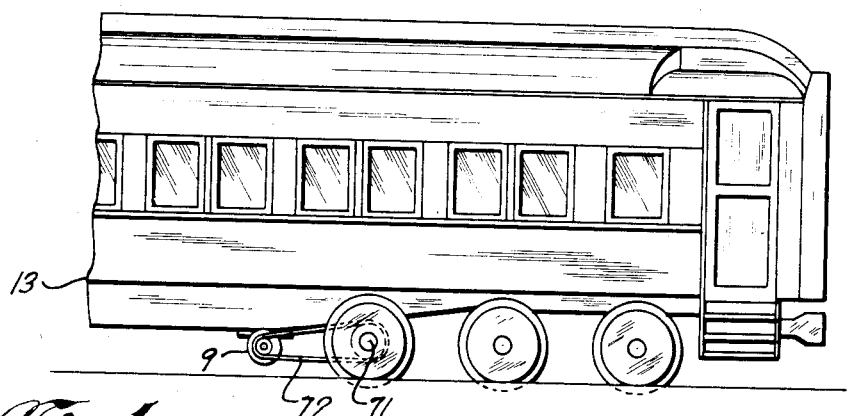

Feb. 12, 1935. W. B. WHITSITT ET AL 1,990,767
REVERSING BRUSH MEANS FOR ELECTRIC GENERATORS
Original Filed Dec. 12, 1932 3 Sheets-Sheet 1

INVENTOR.
WILLIAM B. WHITSITT
HENRY C. WALTER
BY
ATTORNEY.

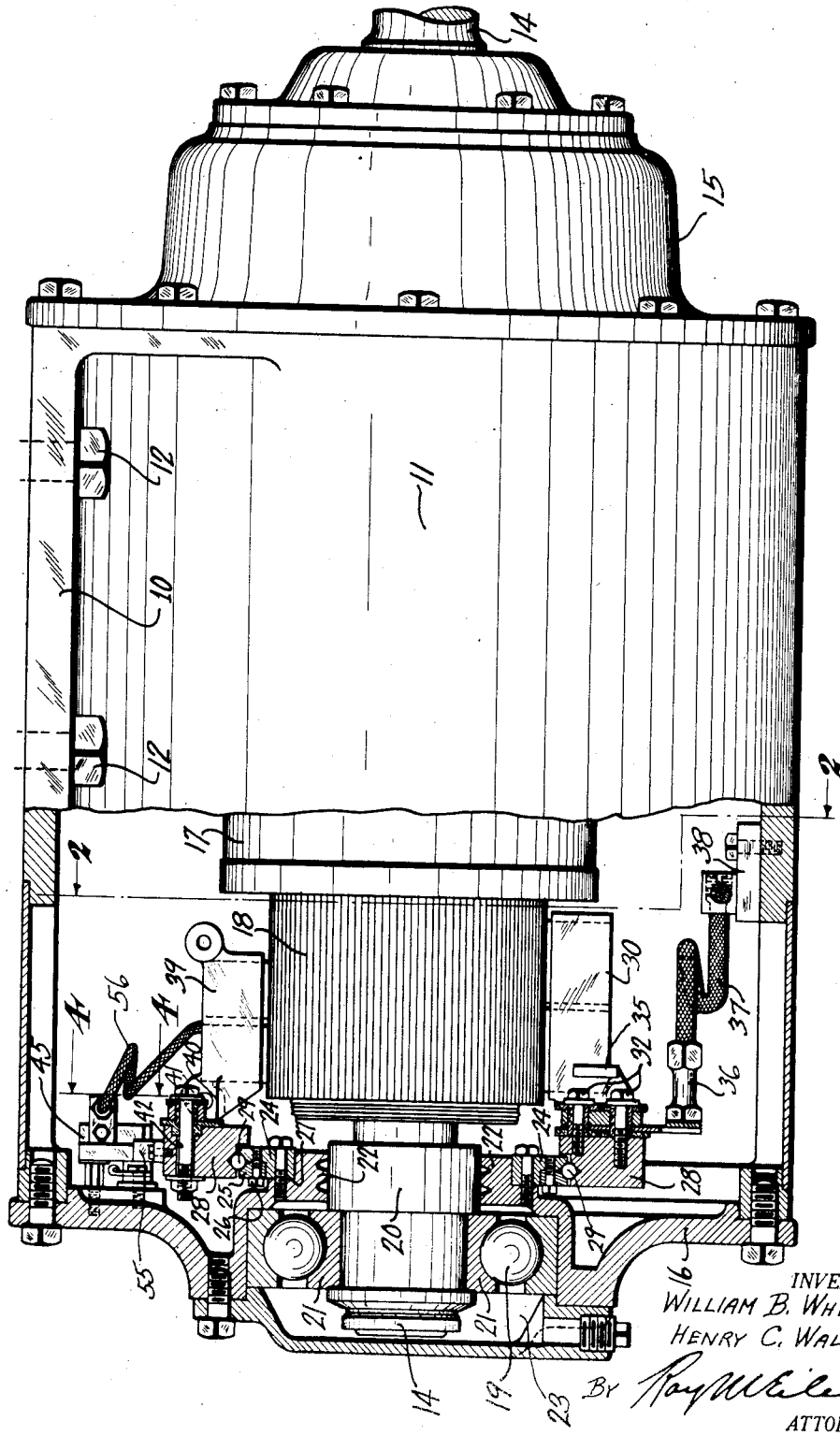

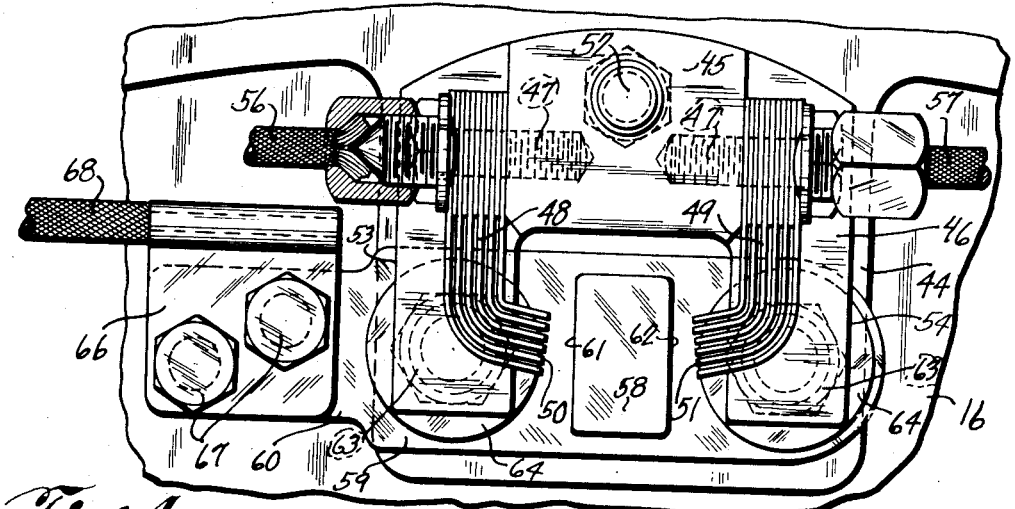
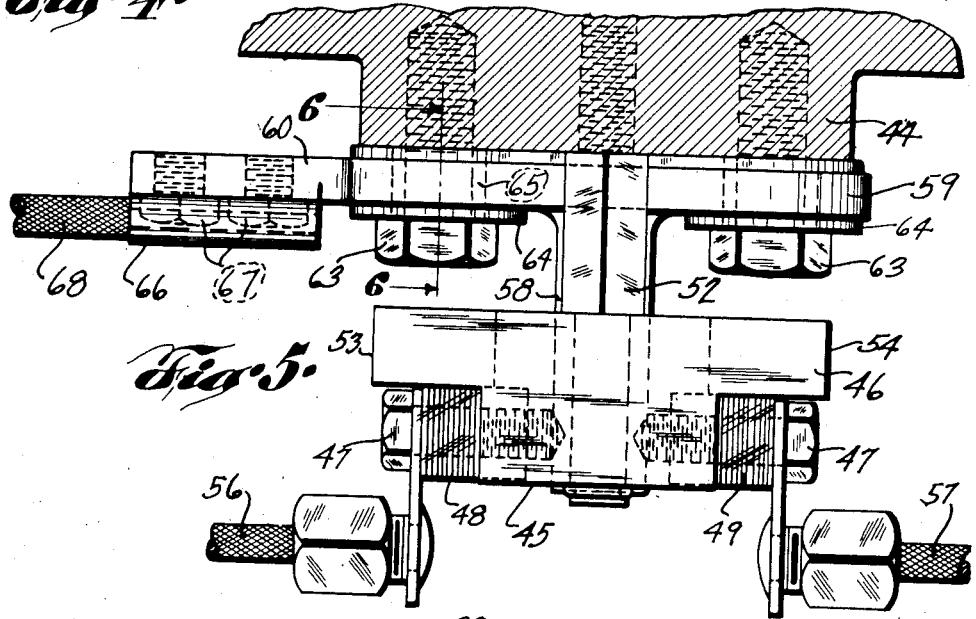
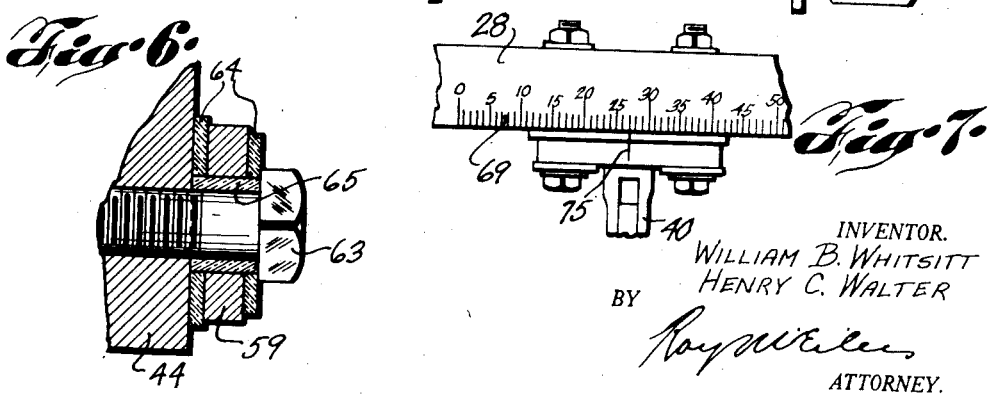

Patented Feb. 12, 1935

1,990,767

UNITED STATES PATENT OFFICE 1,990,767

REVERSING BRUSH MEANS FOR ELECTRIC GENERATORS

William B. Whitsitt, Baltimore, Md., and Henry C. Walter, Beloit, Wis.; said Walter assignor to Fairbanks, Morse & Co., Chicago, Ill., a corporation of Illinois Application December 12, 1932, Serial No. 646,764
Renewed December 17, 1934

7 Claims. (Cl. 171—318)

This invention relates to improvements in electric generators, and more particularly to improvements in the construction of dynamo electric machines employed for supplying the usual power requirements of railway coaches.

In electrical systems in prevalent use on railway cars, it is usual to supply current for car lighting purposes, from a secondary battery connected to an axle driven generator provided with main brushes, and provided with means for angularly displacing the main brushes through a predetermined electrical angle, so as to maintain a unidirectional generator current output, irrespective of changes in the direction of movement of the car, and hence direction of rotation of the generator. The systems heretofore in prevalent use, employ an ordinary direct current generator, together with a voltage regulator of somewhat elaborate type, and require a complicated charging panel to provide for the requisite automatic and manual control of the system. It is a principal object of the present invention to eliminate such elaborate generator control systems, to the end of simplifying the requirements of auxiliary control apparatus, and to provide a generator particularly adapted for supplying the power needs of railway coaches, which is entirely automatic in its operation to maintain a unidirectional current output, irrespective of the direction of movement of the car.

A further object is attained in the provision of an improved generator assembly for railway car use, in which the automatic control of the generator output, responsive to reversal of generator rotation, is effected by the arrangement of the generator brushes. This object may be more specifically stated, in connection with the example of the present disclosure, as attained in a structure including, in circuit relation, a generator of a type employing main brushes, and selectively interposed third brushes.

A still further object is to provide an improved generator assembly, which includes main brushes and selectively utilized third brushes, which are mounted upon a shiftable brush carrier member movable responsively to changes in direction of generator rotation, and means for adjusting the angular position of the third brushes relative to the main brushes, and for visibly indicating the adjusted relation of the brushes.

Yet another object of the invention is attained in an improved switch and switch actuating means for use in controlling the brush circuits of a reversible generator, the switch assembly being of especially rugged type characterized by a minimum number of parts and simple construction, occupying a minimum of space, and requiring but a small space to permit actuation for its movable parts.

Figure 2:
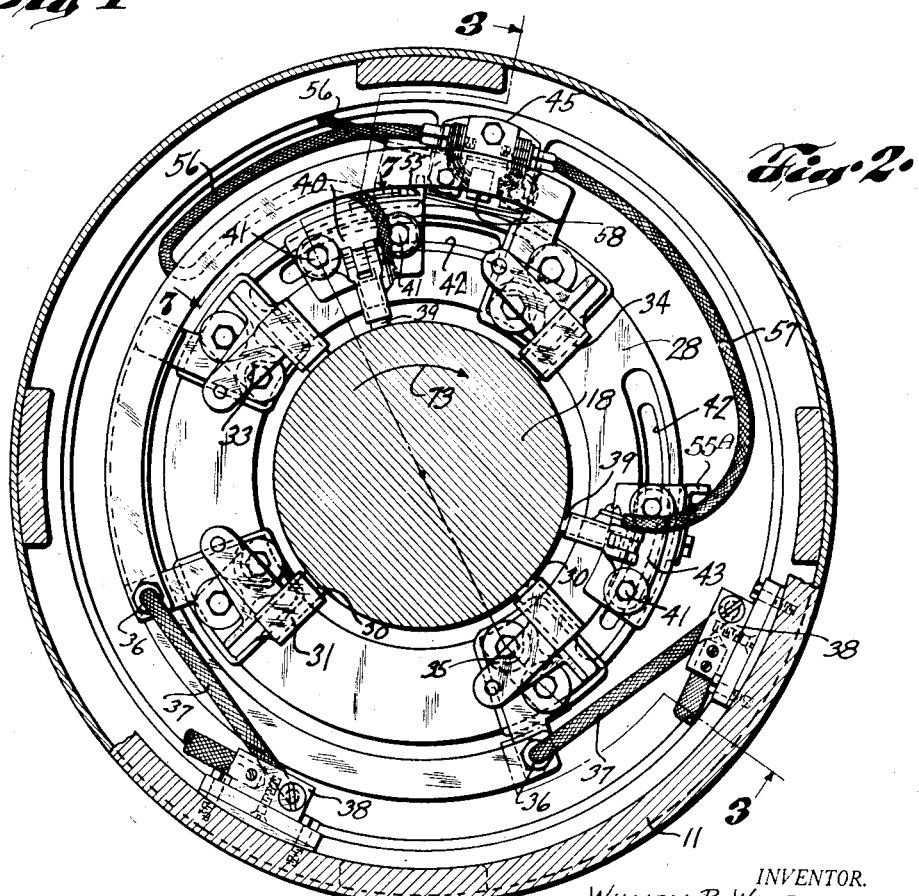

Further objects will appear as the description proceeds, and from the drawings appended hereto, and forming a part of the specification. In the drawings:

Fig. 1 is a fragmentary longitudinal elevation of a preferred form of railway coach, with certain of its parts removed to show a generator of a preferred type and construction presently to be disclosed, mounted beneath the car frame, and adapted to be driven from one of the car axles; Fig. 2 is a sectional elevation of an improved generator, as viewed along line 2—2 in Fig. 3; Fig. 3 is a longitudinal elevation of the generator, partly in section, as viewed along line 3—3 in Fig. 2; Fig. 4 is an enlarged fragmentary elevation of a switch structure as viewed from line 4—4 in Fig. 3; Fig. 5 is a plan view of the structure shown in Fig. 4; Fig. 6 is a fragmentary sectional elevation as viewed along line 6—6 of Fig. 5; and Fig. 7 is an enlarged fragmentary plan view as viewed from line 7—7 in Fig. 2.

Referring now by characters of reference to the drawings, 9 represents, generally, a preferred form of generator which is provided with flange portions 10, preferably formed integrally with a frame structure 11, for mounting the generator, as by bolts 12, for example, to the under frame of a railway car 13. The generator, which is, by preference, of third brush type, arranged to be driven from one of the railway car axles, includes a generator shaft 14, carried in end bearing arms 15 and 16, the bearing arm 15 being disposed on the generator drive end and the arm 16 on the commutator end, as shown in Fig. 3. Mounted on the shaft 14 is an armature 17, and a commutator 18 of usual type. As will be noted, the shaft 14, which is preferably mounted in ball bearings 19, is provided with an enlarged portion 20 to form a shoulder for an inner bearing race 21, and in conjunction with a portion 22 of the bearing arm 16, forms an oil seal to prevent oil, supplied to the bearing 19 and oil chamber 23, reaching the surface of the commutator and consequently adversely affecting efficient generator operation.

Since railway coaches may operate in either direction, the generator must, therefore, be adapted to operate in either direction of rotation. Furthermore, since the generator is generally employed to charge storage cells used for train lighting, in addition to its frequent use for supplying power for other car equipment, the generator polarity must be the same in either direction of rotation. This is accomplished in the present invention, by an improved third brush arrangement, which includes an automatic brush-shifting device for maintaining a fairly constant output over a wide generator speed range, and, in addition, a constant polarity.

To accomplish automatic shifting of the brushes with change in the direction of generator rotation, the brushes are preferably secured to a shiftable brush carrier frame substantially as illustrated in Fig. 3. This brush carrier, as will appear, is arranged for a limited angular displacement within the frame of the machine. The stationary bearing of the shiftable structure includes, by preference, a pair of ring members 24 and 25, the member 25 being secured to the member 24 by any suitable means, such as bolts 26, and the member 24 being secured in a seat portion 27, formed in the bearing arm 22. The brush carrier, above referred to, is indicated at 28, and is rotatable on ball bearings 29, and serves as a mounting for paired main generator brushes 30, each positioned in a suitable brush holder, adjustably secured to the shiftable carrier, as by bolts 32, suitably insulated from the frame. As shown in Fig. 2 there are preferably four of these brush holders 31, 33, 34 and 35, or two pairs 31—34 and 33—35, the paired relation existing since those brushes which are diametrically opposite each other are electrically connected by a suitable conductor (not shown). One brush and holder of each pair is equipped with a terminal 36, to which is electrically connected one end of a flexible conductor 37, the other end thereof being secured to a stationary terminal 38 on the frame 11, whence connection is made into the generator circuit. The brushes and holders may be of a type usually employed in generators of the present order.

Third brushes 39 are suitably positioned in pair, each pair mounted in a brush holder, one of a pair of such holders being shown at 40, which is adjustably secured to the brush carrier 28, as by bolts 41, suitably insulated from the carrier, and extending through an arcuate slot 42 disposed in the shiftable carrier between the main brush holders 33 and 34, as best shown in Fig. 2. This slot permits the third brush assembly to be adjusted within the limits afforded by the length of the slot, so as to enable the characteristics of the generator to be altered for any desired purpose. This feature is of especial advantage in generators of third brush type as used in connection with railway cars, particularly because of the nature of the service to which such generators are subjected. A third brush assembly 43, similar to the one shown at 40, is likewise adjustably mounted on the shiftable carrier 28, between the main brushes 34 and 35, for a purpose which will more fully appear hereinafter.

Secured to an integral lug portion 44 of the bearing arm 16 is a rocking switch assembly 45, consisting of a movable contact mounting 46, to which is secured as by bolts 47, a pair of resilient, brush-type contact members 48 and 49, one on each side of the mounting, and having their contacting portions 50 and 51 facing each other, as shown in Fig. 4. The mounting 46 is pivotally carried, as by a stud 52 extended into the lug portion 44; the stud 52 forming a pivot centrally of the mounting member 46, enables the mounting to receive a rocking or oscillating movement for actuation of the brushes carried thereby, as movable contacts. In construction, the member 46 is preferably a block of substantial thickness and may be constructed of a generally U shape. The forward face of this member is laterally undercut or recessed, so as to form plane faces against which the brush contact members are firmly secured as by screws 47, and also to provide, laterally of the brushes, a plane surface serving to position the brushes against unintended angular displacement. The thickness of the block or mounting 46 is found such that it is provided with opposed end faces 53 and 54. These faces are adapted to be selectively engaged, as will hereinafter appear, by switch actuating arms or lugs 55 and 55A, these lugs being secured in angularly opposed relation to the peripheral portion of the brush carrier structure 28.

The third-brush holder assembly 40 is electrically connected with the movable switch contact 48 by a flexible conductor 56, and a similar conductor 57 serves to connect the third brush assembly 43 with the movable contact 49. A stationary switch contact stud 58, preferably formed integrally with a base 59, having an extended portion 60, is positioned between the switch brushes, and provided with opposed contacting faces 61 and 62 respectively adjacent the brush contacting ends 50 and 51. The base 59 is fixedly secured to the arm or lug portion 44 by suitable bolts 63, the base being insulated from the bolts and bearing arm by suitable insulating strips 64, and insulating collars 65 of fiber or other equivalent material. A terminal block 66 is secured to the extended portion 60 of the base 59, by suitable screws 67, which also conveniently serve the purpose of securing one end of a conductor 68, which has its other end suitably connected in the generator circuit.

Fig. 7 illustrates a micrometer scale 69 formed on the circumferential surface of the member 28 and extending the length of the slot 42 with the scale zero mark on the center line of the main brush 33. The scale is provided to indicate the setting of the third brush, with respect to the frame 28 and hence with respect to the companion main brush 33, so as to indicate any desired angular relation of brushes resulting in desired characteristics of generator action. A similar scale is likewise located in adjacence to the third brush assembly 43, on each of the third brush holders, there being provided a center line or mark 75, serving to indicate, with the scale, the brush angle.

The generator, as shown in Fig. 1, is mounted beneath a railway car 13, and is connected to a car axle 71 by any suitable power transmission means such as a belt 72. In operation, if, for example, the generator armature and commutator rotate in the direction as indicated by the arrow 73, as a result of one direction of movement of the car 13, the brush carrier member 28 is rotated within the frame, due to the frictional contact of the brushes upon the commutator surface, until the switch-actuating lug or arm 55 abuts the face 53 of the rocker 46, thus rocking this member to the position shown in Fig. 2, wherein the switch brush 48 has its face portion 50 in contact with the surface 61 of the stationary switch contact 58, thus completing the generator circuit with the third brush and main brushes in proper operating position for the particular direction of car movement and generator rotation. It will be noted that with the switch parts positioned as in Fig. 2, the third brush 43 is inoperative, since the circuit thereof is incompleted through brush 49 and contact 58, the purpose of the switch 45 being selectively to close the third brush circuits in accordance with the direction of movement of the railway coach and direction of generator rotation. If the car and generator be now reversed, the brush carrier 28 will be rotated until the switch actuating member 55A strikes the rocker face 54 to bring the switch brush 49 into engagement with the stationary contact 58, at the same time opening the circuit between parts 48 and 58. Thus the brush system is regulated automatically by the change in direction of car movement, to maintain a fairly constant generator voltage over a wide range of generator speeds, and to maintain a unidirectional polarity at all times.

If it is desired, at any time, to alter the generator characteristics, or as may become necessary after long and continued service, the bolts 41 of the third brush holders may be loosened, and the brushes shifted through a predetermined angle, as noted on the scales 69, to effect the desired change. The scales 69 are preferably graduated in electrical degrees, but may, if desired, be graduated according to any predetermined units of angular or linear measurement. A particular advantage of such scales results, in a reversible machine of third brush type, in that, if an angular adjustment be made, of one third brush assembly, the other third brush assembly may be accurately correspondingly adjusted, and any predetermined adjustment indicated, and recorded.

It will, of course, be understood that, while the invention has been described with particular reference to a single embodiment thereof, alterations and modifications of the parts described may be made without departing from the full scope of the invention, as defined in the appended claims.

We claim:

1. In an electric power system for a railway car, a generator and a circuit therefor, a frame, main brushes and a pair of third brushes, a brush carrier mounted in angularly displaceable relation on said frame, a stationary contact, a pair of switch contacts on said frame adjacent said carrier, a rockable base on which the said pair of contacts are mounted, one contact of said pair being electrically connected with one of said third brushes, and similarly with the other of said contacts and third brush, and spaced abutments on said carrier each arranged for oppositely engaging said rockable base responsively to change in direction of generator rotation, to effect, through said brushes, a constant polarity of generator output, said rockable base projecting into the path of the said abutments, and coacting therewith to hold the contacts in switch-closing relation.

2. In a reversible generator of commutator type, a frame structure, main brushes, a pair of auxiliary brushes, a brush carrier mounted for angular displacement within the frame, a switch carried by the frame and in circuit with said auxiliary brushes, said switch including a contact fixedly mounted on the frame, an inverted furcate block rockably mounted on said frame, a pair of contacts carried by said block and arranged to engage the fixed contact one at a time, and means forming spaced shouldered abutments on the brush carrier and adapted upon angular displacement thereof, selectively to engage the furcations of said block and actuate said paired movable contacts with respect to said fixed contact, the said block and abutments constituting stops for determining the range of angular displacement of the brush carrier.

3. In a reversible generator of commutator type, a frame, a plurality of brushes, means for selectively interposing certain of said brushes in circuit, according to direction of generator rotation, said means including, in combination with a brush carrier mounted for angular displacement within the frame, a switch including a fixed contact carried by the frame, a pair of contacts movably carried by the frame and mounted in opposed spaced relation to said fixed contact, a mounting member for said movable, paired contacts, and spaced projections secured to said brush carrier and adapted, upon angular displacement thereof, to actuate, selectively, said paired contacts into circuit closing relation with said fixed contact, the mounting member and projections coacting to maintain the switch in closed position, and to limit the displacement of the brush carrier.

4. In a reversible generator of commutator type, a frame, a plurality of brushes, certain thereof adapted to be selectively interposed in circuit according to direction of generator rotation, a brush carrier, adapted for angular displacement within the frame, means for adjusting the angular position of certain of the brushes on the brush carrier, and a brush selecting switch carried by the frame and including a stationary contact, opposed spaced movable contacts, adapted selectively to engage the stationary contact, and between which the stationary contact is disposed, a rocker by which the movable contacts are carried, and means on the brush carrier adapted to engage opposite sides of said rocker as the carrier is displaced in opposite direction within the frame, and coacting with the rocker to limit the range of angular displacement of the brush carrier.

5. In a switch for selectively interposing in circuit, a third brush of a reversible generator of commutator type, in combination with a generator frame, and a shiftable brush carrier associated therewith, a switch base, a stationary contact carried thereby, a substantially U shaped structure pivoted substantially centrally to said base, a pair of movable contacts of brush type, located over the legs of the U shaped structure, the movable contacts being mounted in opposed relation on opposite sides of the fixed contact, and in inoperative position, both spaced therefrom, and opposed projections mounted on the brush carrier, and adapted selectively to engage opposite sides of said pivoted structure to close the circuit through one or the other of said brush type contacts, as the carrier is shifted in opposite directions within the frame.

6. In a reversible brush type generator, a frame structure, a brush carrier mounted for angular displacement within the frame structure, responsive to reversal of the generator, main brushes, a pair of third brushes, selectively utilized with the main brushes in opposite directions of rotation, means for separately adjustably securing the third brushes to the brush carrier, said means including, for each third brush, a brush holder, a bolt, and a slotted bolt aperture; and a graduated scale consisting of companion indicia located respectively on the brush holder and brush carrier, and coacting to indicate the adjusted position of the associated third brush holder on said brush carrier and with respect to the main brushes.

7. In a switch for selectively interposing in circuit, a pair of third brushes of a reversible generator of commutator type, in combination with a generator frame, and a shiftable brush carrier associated therewith, a switch base, a stationary contact carried thereby, an inverted substantially U shaped structure pivoted substantially centrally to said base, a pair of movable contacts of brush type, located over the legs of the U shaped structure, said structure being provided with recessed seats for positioning the contacts carried thereby, the movable contacts being mounted in opposed relation on opposite sides of the fixed contact, and in inoperative position, both spaced therefrom, and opposed abutments on the brush carrier, and adapted selectively to engage opposite sides of said pivoted structure to close the circuit through one or the other of said brush type contacts, as the carrier is shifted in opposite directions within the frame, said abutments and pivoted structure coacting to hold the contacts in either switch-closing position, and constituting means limiting the range of shifting movement of the brush carrier.

WILLIAM B. WHITSITT.
HENRY C. WALTER.